Figure 1:
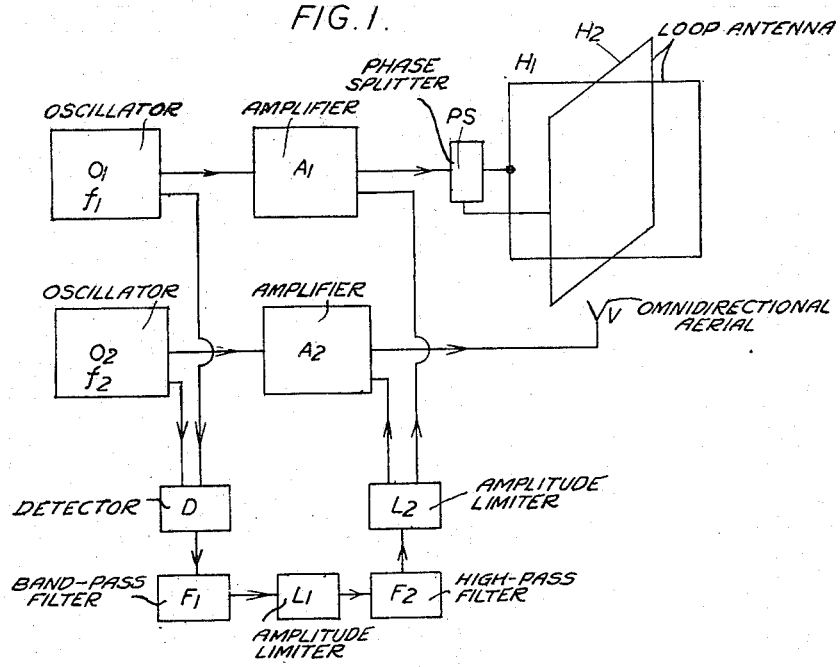

Patented Feb. 5, 1946

2,394,157

UNITED STATES PATENT OFFICE 2,394,157

RADIO BEACON

Charles William Earp, London, England, assignor to Standard Telephones and Cables Limited, London, England, a British company Application February 6, 1943, Serial No. 474,951
In Great Britain April 3, 1942

3 Claims. (Cl. 250—11)

The present invention relates to arrangements for determining the bearing of a mobile radio receiver with respect to a radio beacon.

A dependable omnidirectional radio beacon, giving accurate geographic bearings to a mobile receiver is an ideal which would offer a great advance in the art of aerial navigation. Systems have been proposed and used, but have not become widely adopted owing to complexity of apparatus, slowness in operation, or lack of dependability.

The system most widely used to date is the rotation of the directional field pattern of a transmitter, by the mechanical rotation of its aerial system. A timing pulse is also radiated at those instants when the null point of the directive field pattern is pointed in a particular direction, say north. The bearing is obtained by timing the period between the "North" pulse, and the instant of zero signal defined by the coincidence of the null point with the bearing of the mobile vehicle. Such systems are costly, and are slow in operation, owing to the low maximum speed of rotation obtainable on a large aerial structure.

Purely electrical systems have also been proposed, often giving exactly the same field pattern which would be obtained by a quick rotation of an antenna structure. While providing the necessary speed of operation for use by aircraft, and for cathode ray oscillograph indication of bearing, such systems have depended for accuracy, upon an accurate balance between power radiated from different aerials and delivered by different valves.

It is the object of this invention to provide a radio beacon system which is purely electrical, offering high speed of operation with so-called "instantaneous" cathode ray indication of bearing, while maintaining the accuracy and reliability of the semi-mechanical systems.

According to the invention arrangements for determining the bearing of a mobile radio receiver with respect to a radio beacon comprise a radio beacon system in which the phase of a transmitted wave varies progressively around the transmitting antenna system and means is provided in the receiver for determining the phase of the received waves.

According to a feature of the invention means are provided for transmitting a characteristic signal at a predetermined instant of the wave period, preferably when the amplitude of the wave passes through zero.

In carrying out the invention according to one embodiment the beacon comprises two directional antenna systems, for example, two pairs of antennae each arranged at the ends of the diagonals of a square, or two perpendicularly related loops fed with constant amplitude continuous waves of frequency $f_1$ in such a way as to make the phase of the radiated frequency vary with the angle of the bearing. This is achieved by feeding the two pairs of antennae or loops with equal currents phased by 90°.

The radiated field is circular in pattern, but lines of constant phase are not circles, as in the case of radiation from a single antenna, but are connected up into a single spiral which advances one wave-length from the aerial system for each convolution. At any fixed distance from the transmitting aerial system, the phase of the field rotates uniformly over 360° round the complete circuit defined by such distance.

If, now, we can measure the phase of the received wave as compared with the phase which would be received by a receiver situated due North of the transmitter (but at the same distance) we shall be able to deduce the geographic bearing.

The comparison signal for phase measurement is provided as follows:

1. A second frequency $f_2$, differing by a small amount from $f_1$, by 50 cycles, for example, is radiated from an omnidirectional aerial.
2. Either $f_1$ or $f_2$ or both are momentarily cut off at $(f_1-f_2)$ times per second to provide the necessary comparison signal or zero instant for phase measurement.

Now a receiver picks up both $f_1$ and $f_2$, and a beat note $(f_1-f_2)$ is produced at the detector. The phase of this beat-note rotates uniformly round any circle whose centre is located at the transmitter antenna system in the same way as the phase of $f_1$ rotates.

The necessary comparison signal to provide a reference or zero instant for phase measurement is derived from the sharp negative pulse produced by the momentary interruption of the transmission. In order that such measurement can always indicate the bearing, the negative or timing pulses are applied in such manner that they are received at a receiver situated, say, due north of the beacon, at the same instants as the beat-note $(f_1-f_2)$ passes through zero amplitude.

There are many possible aerial systems which may be used for providing a suitable radiation, the only essential feature being that the radiation of $f_1$ shall be such that the phase of the H. F.

field round a circle whose centre is at the beacon shall progress round that circle. In practice, simple loops would not be used. On waves of "medium" or "long" wave lengths the loops would be replaced by pairs of vertical aerials fed in phase opposition, in order to avoid the radiation of horizontal polarisation. On very short waves it may be desired to make use of horizontal polarisation, in order to avoid reflections from near obstructions. In this case, the loops could be replaced by horizontal dipoles and the omnidirectional radiation $f_2$ could be made from a horizontal loop.

Figure 2:
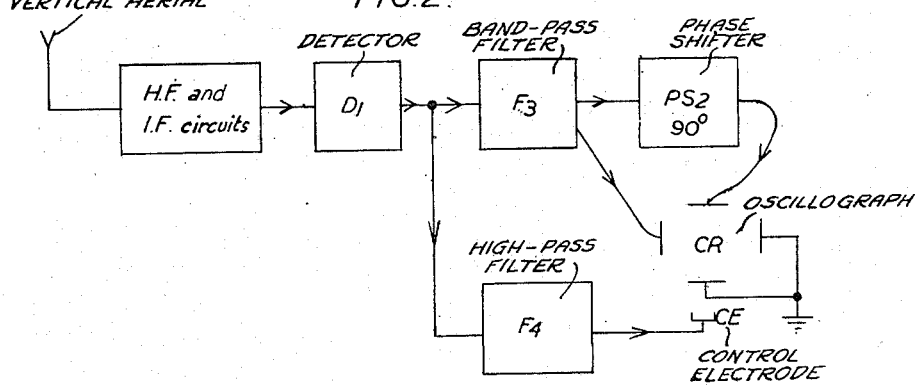

The invention will be further described in conjunction with the accompanying drawing which shows schematically in Figure 1 a typical beacon transmitter, and in Figure 2 a receiver for use in conjunction with the transmitter of Figure 1.

Referring to Figure 1 the master oscillator $O_1$ of frequency $f_1$ feeds into the power amplifier $A_1$, which in turn feeds a pair of crossed loop antennae $H_1$, $H_2$, excitation of the two loops being fed through phase splitting or other arrangement PS.

A second master oscillator $O_2$, of frequency $f_2$ feeds the power amplifier $A_2$ which in turn feeds the vertical omnidirectional aerial V.

The reference or timing pulse is added to the transmission as follows:

$O_1$ and $O_2$ both feed into detector D, where the beat frequency $f_1$—$f_2$ is generated. This frequency ($f_1$—$f_2$) may be amplified and filtered in the band-pass filter $F_1$. The pure sine-wave thus developed is subjected to an amplitude limiter ($L_1$) which produces a square wave-form which is fed to high-pass filter $F_2$ which produces in its output a succession of sharp alternate positive and negative pulses, equally spaced in time. There are ($f_1$—$f_2$) positive pulses per second and ($f_1$—$f_2$) negative pulses per second. These pulses occur at the moments when the amplitude of the wave from which they are produced passes through zero.

The positive pulses are now removed by a unidirectional amplitude limiter $L_2$, which may be a single unit rectifier shunting the positive pulse. The train of negative pulses are now applied to overbias and interrupt the operation of the power amplifiers $A_1$ and $A_2$ causing interruptions in the transmissions from $H_1$, $H_2$ and V. It may be arranged that the interruptions in the transmission occur at the desired instant by a phase control in known manner of the beat-frequency ($f_1$—$f_2$) before pulse generation in $L_1$ and $F_2$ or by a phase control of the H. F. input either to $H_1$ and $H_2$, or the vertical aerial V.

If it is feared that the amplifiers $A_1$ and $A_2$, or the aerial circuits may introduce a variable phase shift in either $f_1$ or $f_2$, then the effect of such instability may be avoided entirely by permitting the detector D to derive its excitation from signals radiated from the aerial system.

A block schematic diagram of a suitable receiver is shown in Fig. 2. The receiver circuits are quite normal and orthodox as far as the detector $D_1$, which delivers a low frequency output corresponding to the H. F. envelope of the received signal, namely the beat-signal produced between $f_1$ and $f_2$.

The beat frequency $f_1$—$f_2$ is filtered off in the bandpass filter $F_3$, and this frequency is applied directly to one pair of plates of a cathode ray oscillograph CR, and to the other pair of plates via a phase shifter PS2 which produces a phase shift of 90°. The result of these two inputs to the oscillograph is a circular bright trace.

The output from $D_1$ is also fed to a high-pass filter $F_4$ which selects the pulse wave-form caused by the momentary interruption of the total transmission. After suitable amplification, if necessary, this pulse train is applied to a control electrode indicated at CE of the oscillograph CR. This "control electrode" may be a focussing grid, in which case the electron beam may be brought into correct focus only at the coincidence of pulses, when the bearing is indicated as a bright spot of light at the periphery of the oscillograph scales. Alternatively, the received pulses may be applied to control the deflection sensitivity of the oscillograph by modulation of the anode supply voltage, for example. In this case the indication is a permanent bright circle with a sharp radial kink at the correct bearing.

Errors may be introduced by a slight drift of oscillator frequencies at the transmitter, resulting in an appreciable change in the beat frequency $f_1$—$f_2$. Such a drift will inevitably produce a variable phase shift in filter $F_3$ in the receiver, and this might well produce a corresponding error on the oscillograph screen.

Such error is entirely avoided by the use of an identical filter $F_1$ at the transmitter for generation of the pulse train. By this means phase distortion of the steady tone ($f_1$—$f_2$) in the receiver is exactly compensated by a similar time distortion in the transmitted pulse train. By means of this arrangement a variable beat-note $f_1$—$f_2$ may be used in order to confuse, and prevent use by an unauthorized user.

It is desirable that the omnidirectional single-phase radiation shall be made from an antenna which, in the horizontal plane, is placed at the centre of the diphase radiating system. The path lengths from receiver to each aerial system must be equal in order to avoid a "semi-circular error."

Whilst a particular embodiment of the invention has been described by way of example, other embodiments will occur to those skilled in the art, such embodiments falling within the scope of the appended claims.

What is claimed is:

1. A direction finding system including a radio beacon transmitting station and a mobile receiving station, said transmitting station comprising a plurality of angularly related antenna systems constituting a first omni-directional antenna system, means for producing high frequency electrical energy of frequency $f_1$ of which portions are fed to each antenna system in relative phases to produce a rotating field about said omni-directional antenna system, a second omni-directional antenna system of constant field phase around the system, means for producing high frequency electrical energy of frequency $f_2$ fed to said second omni-directional antenna system, means for selectively interrupting the transmission of frequencies $f_1$ and $f_2$ when the beat frequency produced therebetween passes through zero amplitude, means for obtaining said beat frequency and applying the same to produce sharply defined, square wave, negative electrical pulses when said beat frequency passes through a predetermined amplitude and means to apply said negative pulses to selectively interrupt the transmission of frequencies $f_1$ and $f_2$, said means for producing sharply defined, square wave, negative pulses including a detector fed with frequencies $f_1$ and $f_2$, thereby producing a beat sine wave, an amplitude limiter fed thereby and converting said beat wave into a square wave form, a high-pass filter fed with said square wave and producing therefrom a succession of sharp alternate positive and negative pulses, a unidirectional amplitude limiter fed with said pulses of mixed polarity and removing therefrom the positive pulses, and means feeding the remaining negative pulses derived from said unidirectional limiter periodically abruptly to cut off the energy fed to both said antenna systems, whereby there is produced a sharply defined reference point of change of radiation to zero during each cycle of said beat frequency.

2. The direction finding system of claim 1, in combination with a filter at the transmitting station for passing the beat frequency $f_1-f_2$ to produce therefrom said negative pulses, a cathode ray oscillograph at said mobile receiving station and a filter at said receiving station for passing the frequency $f_1-f_2$ to said oscillograph, said filters being identical, whereby errors due to frequency drifts at the transmitting station are eliminated.

3. A direction finding system according to claim 1, in which are included master oscillators constituting the means for producing high frequency electrical energy of frequencies $f_1$ and $f_2$, and biased amplifiers fed by said oscillators, and in which said square wave negative pulses are applied to the grid bias portions of said amplifiers so as abruptly to cut off the respective outputs thereof.

CHARLES WILLIAM EARP.